United States Patent
Dean et al.

(10) Patent No.: US 9,858,590 B1
(45) Date of Patent: Jan. 2, 2018

(54) DETERMINING BETTER AD SELECTION, SCORING, AND/OR PRESENTATION TECHNIQUES

(75) Inventors: Jeffrey A. Dean, Palo Alto, CA (US); Georges R. Harik, Mountain View, CA (US); Noam Shazeer, Palo Alto, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2576 days.

(21) Appl. No.: 10/748,744

(22) Filed: Dec. 30, 2003

(51) Int. Cl.
G06Q 30/00 (2012.01)
G06Q 30/02 (2012.01)

(52) U.S. Cl.
CPC .............. G06Q 30/0244 (2013.01)

(58) Field of Classification Search
None
See application file for complete search history.

(56) References Cited

U.S. PATENT DOCUMENTS

| | | | | |
|---|---|---|---|---|
| 5,218,536 A * | 6/1993 | McWherter | ........... | G06F 17/273 707/E17.104 |
| 5,909,670 A | 6/1999 | Trader et al. | | |
| 5,936,572 A * | 8/1999 | Loomis | ................ | G01C 21/206 342/357.29 |
| 6,144,944 A * | 11/2000 | Kurtzman, II | ......... | G06Q 30/02 705/1.1 |
| 6,285,999 B1 | 9/2001 | Page | | |
| 7,031,875 B2 | 4/2006 | Ellenby et al. | | |
| 7,136,875 B2 | 11/2006 | Anderson et al. | | |
| 7,716,161 B2 | 5/2010 | Dean et al. | | |
| 7,895,193 B2 | 2/2011 | Cucerzan et al. | | |
| 2001/0001145 A1 * | 5/2001 | Barnett et al. | ................... | 705/14 |
| 2001/0039510 A1 * | 11/2001 | Galomb | ................ | G06Q 30/02 705/14.73 |
| 2002/0019768 A1 * | 2/2002 | Fredrickson et al. | .......... | 705/14 |
| 2002/0038165 A1 * | 3/2002 | McHale et al. | ................ | 700/216 |
| 2002/0095330 A1 | 7/2002 | Berkowitz et al. | | |
| 2002/0132575 A1 * | 9/2002 | Kesling et al. | .............. | 455/2.01 |
| 2003/0033190 A1 * | 2/2003 | Shan et al. | ........................ | 705/10 |
| 2003/0120641 A1 * | 6/2003 | Pelletier | ............................ | 707/3 |
| 2004/0017395 A1 * | 1/2004 | Cook | ........................... | 345/745 |
| 2004/0059712 A1 * | 3/2004 | Dean et al. | ........................ | 707/1 |
| 2004/0103024 A1 | 5/2004 | Patel et al. | | |
| 2004/0198386 A1 | 10/2004 | Dupray | | |
| 2005/0137939 A1 | 6/2005 | Calabria et al. | | |
| 2005/0222906 A1 * | 10/2005 | Chen | ............................... | 705/14 |

(Continued)

OTHER PUBLICATIONS http://web.archive.org/web/20040210195940/technothenet.com/sql/count.htm.

(Continued)

Primary Examiner — David Stoltenberg
Assistant Examiner — Allan Woodworth, II
(74) Attorney, Agent, or Firm — Fish & Richardson P.C.

(57) ABSTRACT

Different ad selection techniques may be evaluated and compared by (i) combining ads generated using at least two different techniques and (ii) determining performance statistics of these combined (e.g., interleaved) advertising serves over time. The relative performance of the different techniques can then be determined. These principles can also be used to gauge different ad scoring techniques. These principles can also be used to gauge different ad rendering techniques.

64 Claims, 6 Drawing Sheets

(56) References Cited

U.S. PATENT DOCUMENTS

2007/0061317 A1 3/2007 Ramer et al.
2007/0239531 A1 10/2007 Beaufays et al.

OTHER PUBLICATIONS 1-800-FREE411: Welcome, printed from <http://www.free411.com> on Mar. 30, 2006, 2 pages.
1-800-FREE411: Advertisers, printed from <http://www.free411.com/advertise.html> on Mar. 30, 2006, 3 pages.
International Search Report, PCT/US2007/07323.
www.tizag.com, SQL: Where clause.
Brin et al., "The Anatomy of a Large-Scale Hypertextual Search Engine," 7th Int'l World Wide Web Conference, Brisbane, Australia. 1998, 20 pages.

\* cited by examiner

DETERMINING BETTER AD SELECTION, SCORING, AND/OR PRESENTATION TECHNIQUES

This application is related to U.S. patent application Ser. No. 11/394,143 filed Mar. 30, 2006, assigned to the assignee of the subject application.

§1. BACKGROUND OF THE INVENTION

§1.1 Field of the Invention

The present invention concerns advertising. In particular, the present invention concerns the targeted serving and rendering of ads.

§1.2 Background Information

Advertising using traditional media, such as television, radio, newspapers and magazines, is well known. Unfortunately, even when armed with demographic studies and entirely reasonable assumptions about the typical audience of various media outlet, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are typically presented to their advertising audience in the form of "banner ads"—i.e., a rectangular box that includes graphic components. When a member of the advertising audience (referred to as a "viewer" or "user" in the specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is rendered) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registers on a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment.

Similarly, the hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com", which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered with a search results page and so that they will be relevant, presumably, to the query that prompted the search results page. Other targeted advertising systems, such as those that target ads based on e-mail information (See, e.g., the systems described in U.S. patent application Ser. No. 10/452,830 (incorporated herein by reference), titled "SERVING ADVERTISEMENTS USING INFORMATION ASSOCIATED WITH E-MAIL", filed on Jun. 2, 2003 and listing Jeffrey A. Dean, Georges R. Harik and Paul Bucheit as inventors.); or those that target ads based on content (See, e.g., U.S. patent application Ser. No. 10/375,900 (incorporated herein by reference), titled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors.) may have similar challenges. That is, advertising systems would like to present advertisements that are relevant to the user requested information in general, and related to the current user interest in particular.

As can be appreciated from the foregoing, targeted advertising systems, such as keyword-targeted advertising or content-targeted advertising provide very useful forms of advertising. However, even with such ad serving systems there are many different options for (i) determining relevant ads, (ii) scoring ads (e.g., for relative positioning, and/or enhanced features, etc.) (how to arbitrate desired features among ads and advertisers) and (iii) rendering ads (how ads are to be presented to their intended audience). Both an ad serving entity and advertisers would like to know which of the various different options perform best (in general, or in a particular context).

In view of the foregoing, there is a need for methods and apparatus for comparing (i) ad selection techniques, (ii) ad scoring techniques, and/or (iii) ad rendering techniques.

§2. SUMMARY OF THE INVENTION

The present invention helps ad serving entities and/or advertisers to compare (i) ad selection techniques, (ii) ad scoring techniques, and/or (iii) ad rendering techniques. The present invention may do so by serving ads pursuant to at least two different techniques, and tracking the performance of the ads served pursuant to each of the ad least two different techniques.

§3. BRIEF DESCRIPTION OF THE DRAWINGS

§4. DETAILED DESCRIPTION

The present invention may involve novel methods, apparatus, message formats and/or data structures for comparing (i) ad selection techniques, (ii) ad scoring techniques, and/or (iii) ad rendering techniques. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as any patentable subject matter described.

In the following, environments in which, or with which, the present invention may operate are described in §4.1. Then, exemplary embodiments of the present invention are described in §4.2. Examples of operations are provided in §4.3. Finally, some conclusions regarding the present invention are set forth in §4.4.

§4.1 Environments in which, or with which, the Present Invention May Operate

§4.1.1 Exemplary Advertising Environment

Figure 1:
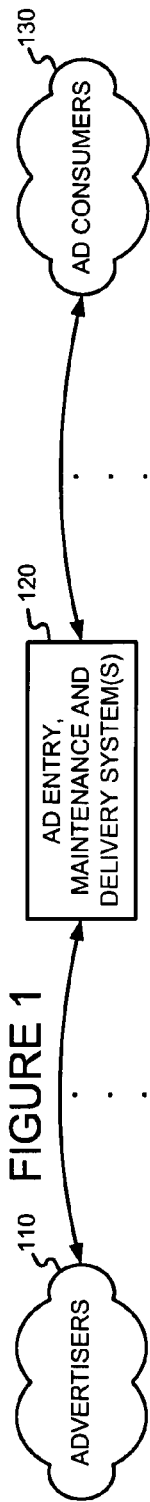
FIG. 1 is a high-level diagram showing parties or entities that can interact with an advertising system.

FIG. 1 is a high level diagram of an advertising environment. The environment may include an ad entry, maintenance and delivery system (simply referred to an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
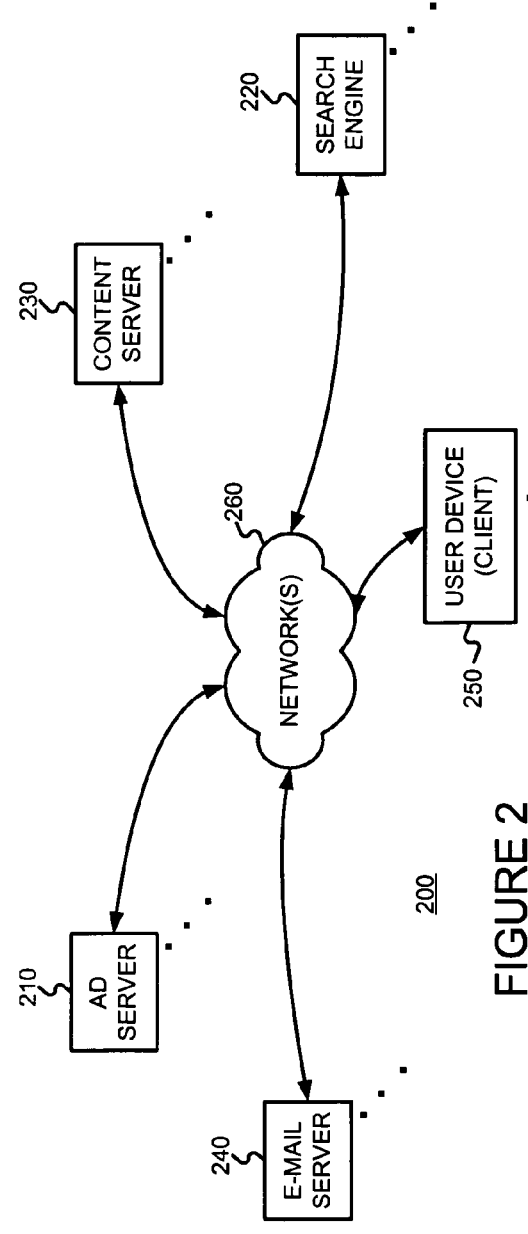
FIG. 2 illustrates an environment in which advertisers can target their ads on search results pages generated by a search engine, documents served by content servers, and/or e-mail.

FIG. 2 illustrates an environment 200 in which the present invention may be used. A user device (also referred to as a "client" or "client device") 250 may include a browser facility (such as the OPERA browser, the EXPLORER browser from MICROSOFT, or the NAVIGATOR browser from AOL/Time TIME WARNER), an e-mail facility (e.g., OUTLOOK from MICROSOFT), etc. A search engine 220 may permit user devices 250 to search collections of documents (e.g., Web pages). A content server 230 may permit user devices 250 to access documents. An e-mail server (e.g., HOTMAIL from MICROSOFT NETWORK, YAHOO MAIL, etc.) 240 may be used to provide email functionality to user devices 250. An ad server 210 may be used to serve ads to user devices 250. The ads may be served in association with search results provided by the search engine 220, content provided by the content server 230, and/or e-mail supported by the e-mail server 240 and/or user device e-mail facilities.

Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. Alternatively, or in addition, such information may be provided back to the ad server 120/210 by some other means.

As discussed in U.S. Patent Application Serial No. U.S. patent application Ser. No. 10/375,900 (incorporated herein by reference), ads targeted to documents served by content servers may also be served.

Finally, the e-mail server 240 may be thought of, generally, as a content server in which a document served is simply an e-mail. Further, e-mail applications (such as MICROSOFT OUTLOOK for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

§4.1.2 Exemplary Ad Entry, Maintenance and Delivery Environment

Figure 3:
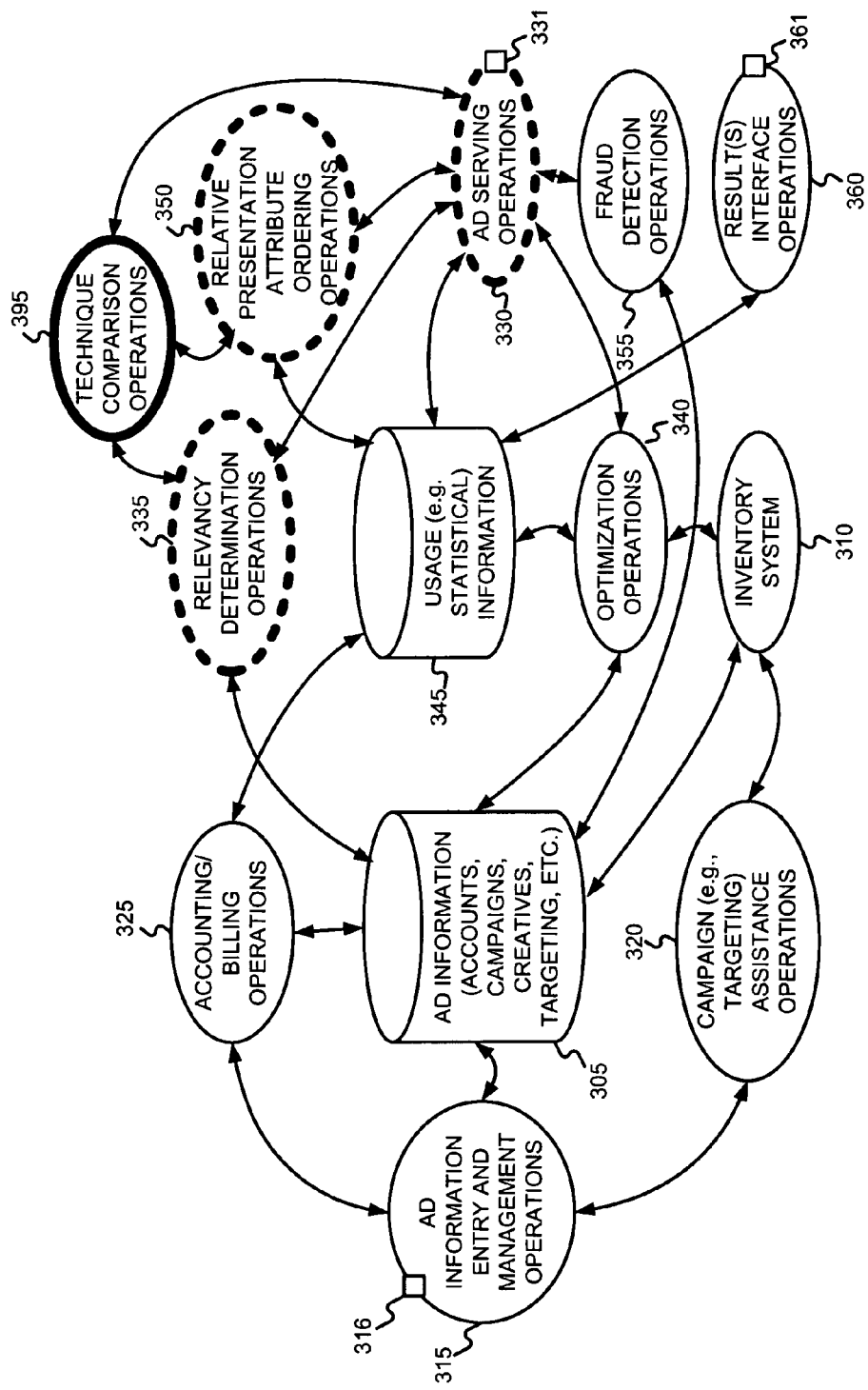
FIG. 3 is a bubble diagram of operations that may be performed in an ad serving system, and how the present invention may be used with such operations.

FIG. 3 illustrates an exemplary ad system 120', consistent with the present invention. The exemplary ad system 120' may include an inventory system 310 and may store ad information 305 and usage information 345. The exemplary system 120' may support ad information entry and management operations 315, campaign (e.g., targeting) assistance operations 320, accounting and billing operations 325, ad serving operations 330, relevancy determination operations 335, optimization operations 340, relative presentation attribute assignment (e.g., position ordering) operations 350, fraud detection operations 355, and result interface operations 360.

Advertisers 110 may interface with the system 120' via the ad information entry and management operations 315 as indicated by interface 316. Ad consumers 130 may interface with the system 120' via the ad serving operations 330 as indicated by interface 331. Ad consumers 130 and/or other entities (not shown) may also interface with the system 120' via results interface operations 360 as indicated by interface 361.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 305 may include more or less information, and may be organized in a number of different ways.

The ad information 305 can be entered and managed via the ad information entry and management operations 315. Campaign (e.g., targeting) assistance operations 320 can be employed to help advertisers 110 generate effective ad campaigns. For example, the campaign assistance operations 320 can use information provided by the inventory system 310, which, in the context of advertising for use with a search engine, may track all possible ad impressions, ad impressions already reserved, and ad impressions available for given keywords. The ad serving operations 330 may service requests for ads from ad consumers 130. The ad serving operations 330 may use relevancy determination operations 335 to determine candidate ads for a given request. The ad serving operations 330 may then use optimization operations 340 to select a final set of one or more of the candidate ads. Finally, the ad serving operations 330 may use relative presentation attribute assignment operations 350 to order the presentation of the ads to be returned. The fraud detection operations 355 can be used to reduce fraudulent use of the advertising system (e.g., by advertisers), such as through the use of stolen credit cards. Finally, the results interface operations 360 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 361 and may include information to identify the ad and time the ad was served, as well as the associated result.

Ad relevancy determination operations 335 may use an ad selection technique. However, the ad serving entity may want to consider one or more alternative techniques. Technique comparison operations 395 may be used to test and compare the performance of different ad selection techniques.

Similarly relative presentation attribute ordering operations 350 may use an ad scoring technique. However, the ad serving entity may want to consider one or more alternative techniques. Technique comparison operations 395 may be used to test and compare the performance of different ad scoring techniques.

Finally, ad serving operations 330 may use an ad rendering technique. However, the ad serving entity may want to consider one or more alternative techniques. Technique comparison operations 395 may be used to test and compare the performance of different ad serving techniques.

§4.1.2 Definitions

Online ads, such as those used in the exemplary systems described above with reference to FIGS. 1, 2, 3, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., AMERICA ONLINE, GOGGLE, YAHOO) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., EXPLORER or NETSCAPE), a media player (e.g., an MP3 player, a REALNETWORKS streaming audio file player, etc.), a viewer (e.g., an ADOBE ACROBAT pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples, of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

The present invention helps ad serving entities and/or advertisers to compare (i) ad selection techniques, (ii) ad scoring techniques, and/or (iii) ad rendering techniques. The present invention may do so by serving ads pursuant to at least two different techniques, and tracking the performance of the ads served pursuant to each of the ad least two different techniques. Exemplary methods for doing this are described in §4.2.1 below. Exemplary apparatus are described in §4.2.2 below. Finally, various refinements and alternatives are described in §4.2.3 below.

Figure 4:
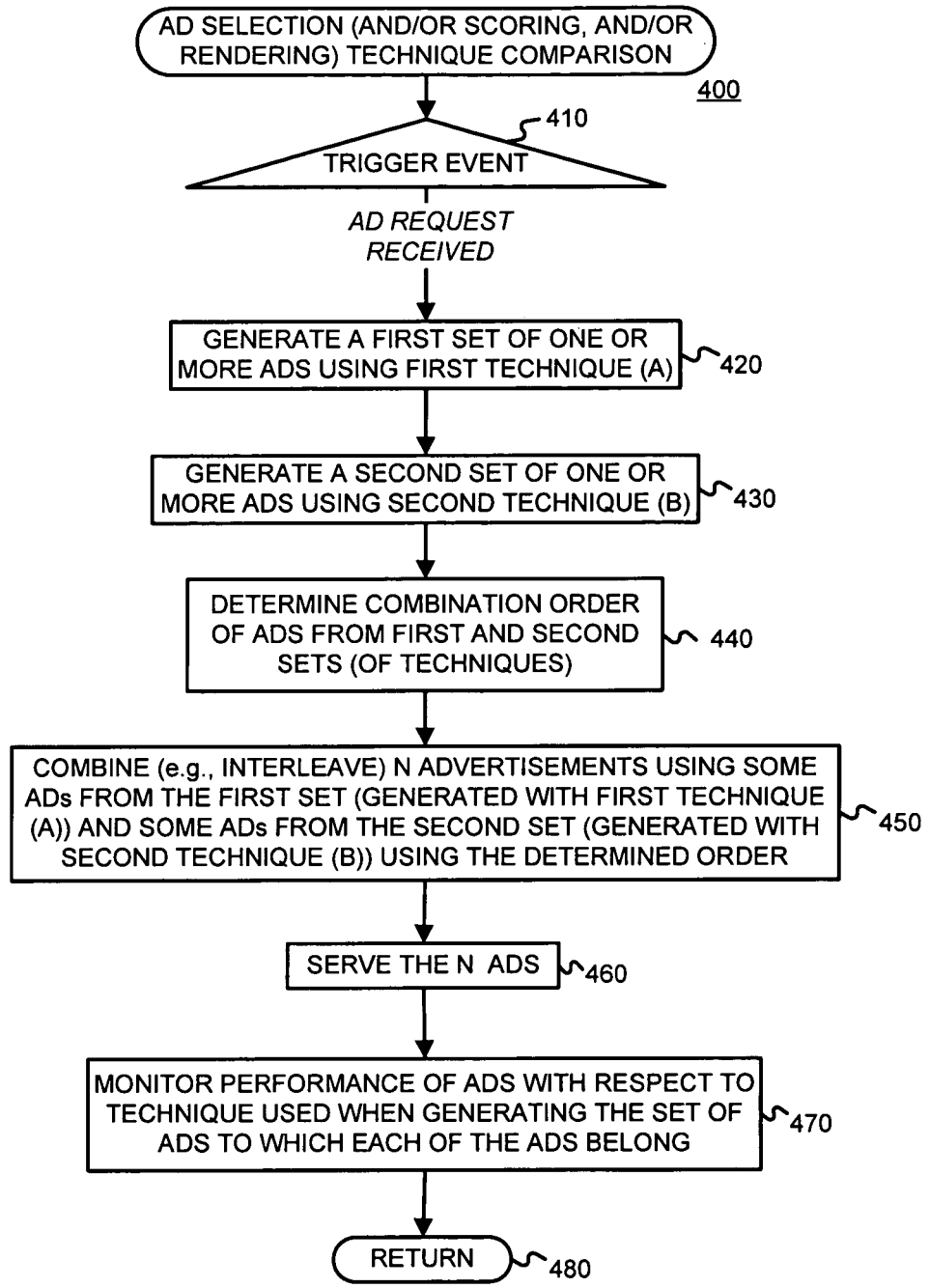
FIG. 4 is a flow diagram of an exemplary method that may be used to compare (i) ad selection techniques, (ii) ad scoring techniques, and/or (iii) ad rendering techniques, in a manner consistent with the present invention.

§4.2.1 Exemplary Methods for Comparing Ad Selection, Scoring, and/or Rendering Techniques FIG. 4 is a flow diagram of an exemplary method 400 that may be used to compare (i) ad selection techniques, (ii) ad scoring techniques, and/or (iii) ad rendering techniques, in a manner consistent with the present invention. (Recall, e.g., operations 395 of FIG. 3.) As indicated by trigger event block 410, the main acts of the exemplary method 400 are performed when an ad request is received. A first set of one or more ads is generated using a first technique (A), and a second set of one or more ads is generated using a second technique (B), as indicated by blocks 420 and 430, respectively. Note that generating a set of ads may involve selecting ads, scoring ads, and/or defining how ads are to be rendered. Accordingly, the difference in the first (A) and second (B) techniques for generating ads may fall under one of seven varieties, as shown in the Table:

| DIFFERENCE VARIETY | AD SELECTION | OPERATION AD SCORING | HOW AD IS TO BE RENDERED |
|---|---|---|---|
| 1 | A & B same | A & B same | A & B different |
| 2 | A & B same | A & B different | A & B same |
| 3 | A & B same | A & B different | A & B different |
| 4 | A & B different | A & B same | A & B same |
| 5 | A & B different | A & B same | A & B different |
| 6 | A & B different | A & B different | A & B same |
| 7 | A & B different | A & B different | A & B different |

As indicated by blocks 440 and 450, a combination order of ads from the first and second sets (and therefore of ads generated using technique A and technique B) is determined, and N advertisements are combined using some ads from the first set (generated with the first technique A) and some ads from the second set (generated with the second technique B) using the determined combination order. The N ads are then served as indicated by block 460. As indicated by block 470, for each ad served, the performance of the ad is monitored with respect to the technique used when generating the set of ads to which the ad belongs.

Recall from block 440 that a combination order of the ads from the first set (generating using technique A) and second set (generated using technique B) is selected. In one embodiment of the present invention, the technique used first is selected at random. If there are two competing techniques, the random function should select each technique 50% of the time. For example, technique A may have a chance to be in positions 1, 3, 5, . . . 50% of the time, as may technique B.

Figure 5:
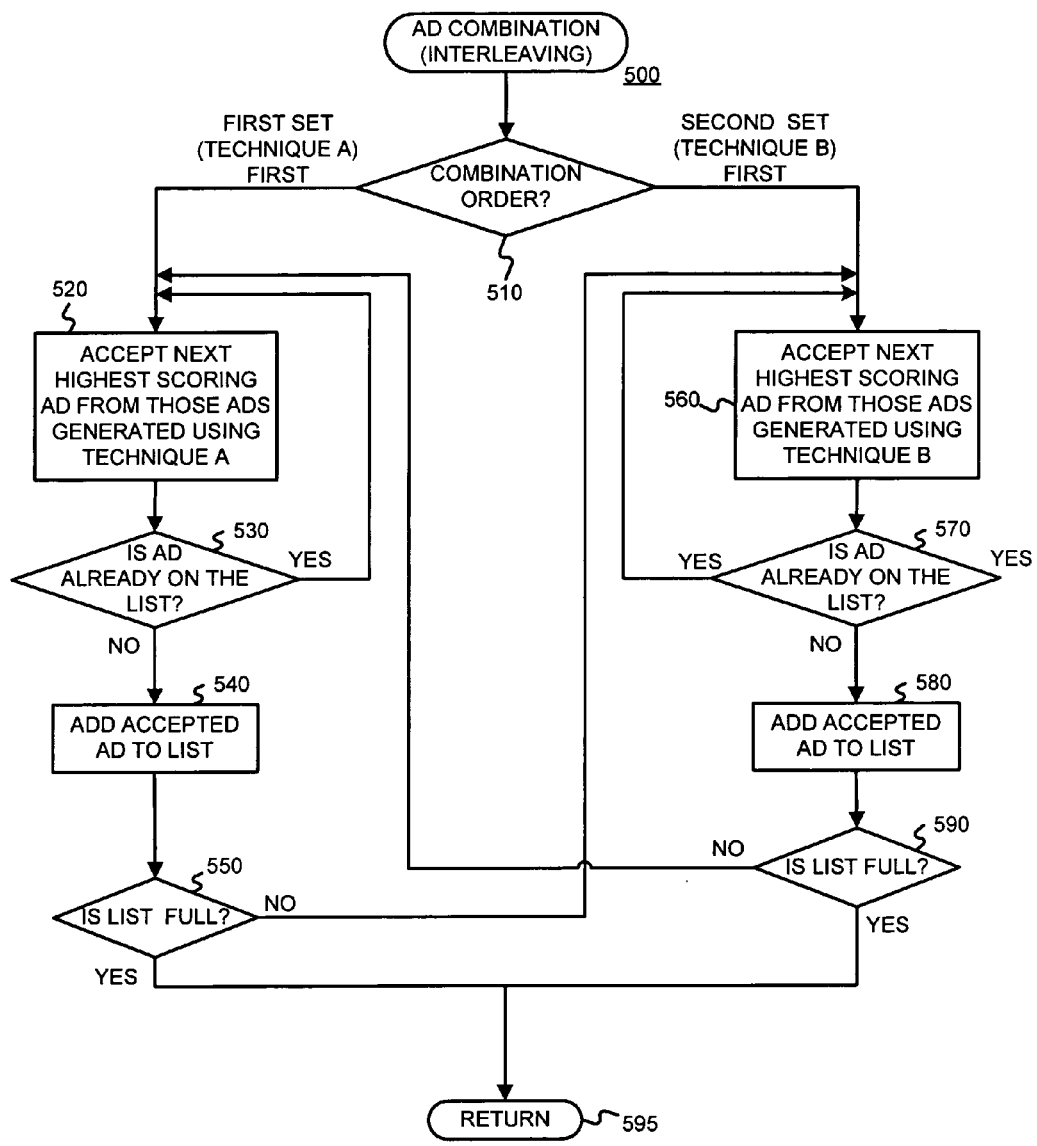
FIG. 5 is a flow diagram of an exemplary method that may be used to combine ads selected, scored, and/or rendered using different techniques, in a manner consistent with the present invention.

FIG. 5 is a flow diagram of an exemplary method 500 that may be used to combine ads selected, scored, and/or rendered using different techniques, in a manner consistent with the present invention. In the exemplary method 500, ads are combined by interleaving ads. As indicated by block 510, execution of the method 500 may depend on the determined combination order (Recall block 440 of FIG. 4.) of the ads from the two sets. If the first set (technique A) was determined to be first, the method 500 continues to block 520, but if the second set (technique B) was determined to be first, the method 500 continues to block 560 (described later). Referring to block 520, the next highest scoring ad from the first set of ads (generated using technique A) is accepted. As indicated by decision block 530, it is determined whether or not a list of N ads already contains the accepted ad. If the accepted ad is already on a list of N ads, the method 500 branches back to block 520 to get the next highest scoring ad from the first set. If, on the other hand, the accepted ad is not already on a list of N ads, it is added to the list as indicated by block 540. Then, it is determined whether or not the list is full as indicated by block 550. If the list is full, the method 500 is left via node 595. If, on the other hand, the list is not full, the method 500 branches to block 560. Referring to block 560, the next highest scoring ad from the second set of ads (generated using technique B) is accepted. As indicated by decision block 570, it is determined whether or not a list of N ads already contains the accepted ad. If the accepted ad is already on a list of N ads, the method 500 branches back to block 560 to get the next highest scoring ad from the second set. If, on the other hand, the accepted ad is not already on a list of N ads, it is added to the list as indicated by block 580. Then, it is determined whether or not the list is full as indicated by block 590. If the list is full, the method 500 is left via node 595. If, on the other hand, the list is not full, the method braches to block 520. As can be appreciated from the foregoing, the list of N ads includes odd ads from a one set, and even ads from another set, thereby interleaving ads determined using different techniques for determining, scoring, and/or rendering ads.

Referring back to decision blocks 530 and 570, it is possible for an ad of a set to already be included in the list. For example, it may have been added to the list from the other set. Recall from block 470 of FIG. 4 that the performance of the ads is monitored with respect to the technique used to generate the set to which the particular ad belongs. This permits technique-specific performance to be tracked. Note, however, that when an ad was in both sets and would have been added to the list from one set if it had not already been added to the list from the other set, the performance of the ad may be equally applicable to both sets, and therefore to both techniques. In such instances, the ad may be flagged such that either (a) the performance of the ad will be attributable to both techniques, or (b) the performance of the ad will be attributable to neither of the techniques (e.g., its performance needn't be tracked at all).

§4.2.2 Exemplary Apparatus

Figure 6:
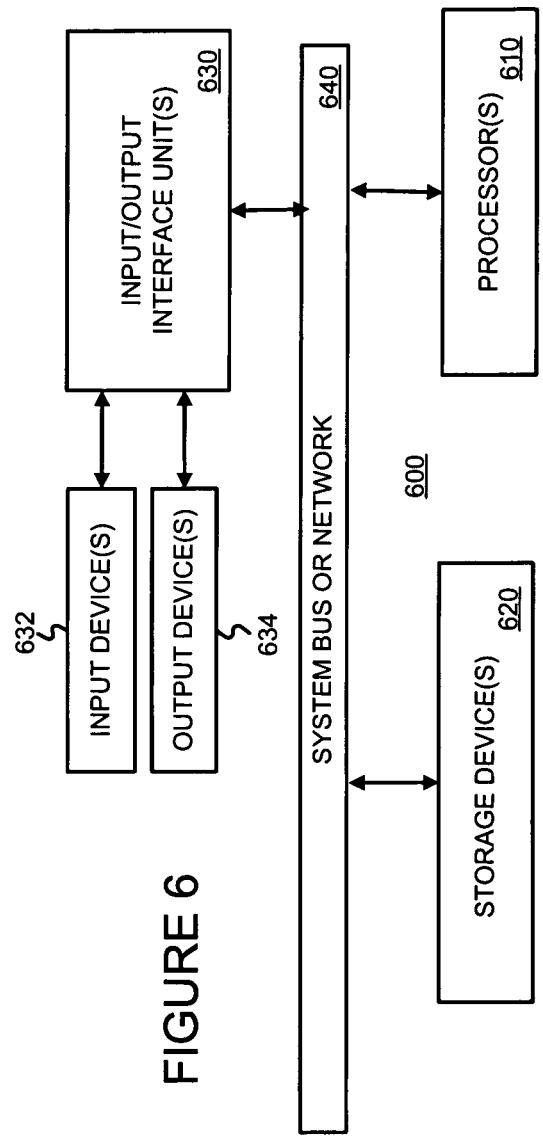
FIG. 6 is a high-level block diagram of apparatus that may be used to perform at least some of the various operations that may be used and store at least some of the information that may be used and/or generated in a manner consistent with the present invention.

FIG. 6 is high-level block diagram of a machine 600 that may be used to perform one or more of the operations discussed above. The machine 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

The ad server 210, user device (client) 250, search engine 220, content server 230, and/or e-mail server 240 may be implemented as one or more machines 600.

§4.2.3 Refinements and Alternatives

Although the methods 400 and 500 described in §4.2.1 above were useful for comparing two techniques and interleaved the ads generated by the two techniques, many alternatives will be apparent to those skilled in the art. For example, more than two techniques may be compared and interleaved. For example, in a case where T techniques are being compared, each technique may have a $100/T\%$ chance of being first. If the techniques (A, B, and C) are interleaved, assuming no duplicate ads across all sets, one possible order may be A1, B1, C1, A2, B2, C2, A3 . . . . Although the interleaving of single ads was described in the method 500, a set may provide two or more consecutive ads. For example, one possible order may be B1, B2, A1, A2, C1, C2, B3, B4, A3, A4, . . . .

The performance of the ads monitored may include one or more of clicks, conversions, click-through rate, conversion-rate, user rating, etc. If advertisers pay the ad serving entity based on a certain user behavior (e.g., clicks), it may be desirable to monitor a corresponding performance (e.g., click-through rate). The performance may be monitored using binary information (responded vs. not responded), or information weighted by a "goodness" metric sought to be optimized (e.g., advertising revenue, advertiser profit, etc.).

Recall from the Table in §4.2.1 above that different techniques may differ in one or more of (i) how they select ads, (ii) how they score ads, and (iii) how they render ads. Different ad selection techniques may include, for example, keyword-targeted ad selection, a particular type of keyword-targeted ad selection (e.g., one or more of exact, phrase, and/or broad), content-targeted (including, for example, Webpage, e-mail, newsletter, etc.) ad selection, a particular type of content-targeted ad selection, user profile-targeted ad selection, a particular type of user profile-targeted ad selection, a geo-location-targeted ad selection, a particular type of geo-location-targeted ad selection, a temporal-targeted ad selection, a particular type of temporal-targeted ad selection, etc. Thus, for example, a first technique might use exact keyword matching to select ads, while a second technique might use any type of keyword matching to select ads. As another example, a first technique might use only information in the subject line of an e-mail for content-targeted selection of ads, while a second technique might use only information in the body of an e-mail for content-targeted selection of ads.

Different ad scoring techniques may use various different scoring functions and may consider one or more factors such as, a price the advertiser will pay for a given result (e.g., impression, selection, conversion, etc.), a maximum price the advertiser is willing to pay for a given result, a performance score of the ad, a strength or confidence of the selection match, user profile information, user behavior information, advertiser quality information, various matches of targeting information, etc. Thus, for example, a first technique might use a product of maximum price and click-through rate to score ads, while a second technique might use a sum of a price ratio and advertiser quality to score ads.

Different ad rendering techniques may include ordering ad positions (e.g., using ad scores), applying various ad features (e.g., font type, font size, media type (text, audio, graphics, video, or any combination), ad size, border type, etc.

Thus, for example, a first technique might render text ads with a blue font on a yellow background in the right margin of a Web page, while a second technique might render text ads with a black font with a light blue background in the top margin of a Web page.

Although a series of acts may have been described with reference to a flow diagram, the order of acts may differ in other implementations when the performance of one act is not dependent on the completion of another act. Further, non-dependent acts may be performed in parallel. Furthermore, although the main acts in exemplary method 500 were described as being performed after an ad request, this is not necessary. For example, certain acts can be performed before an ad request.

§4.3 Examples of Operations

Figure 7:
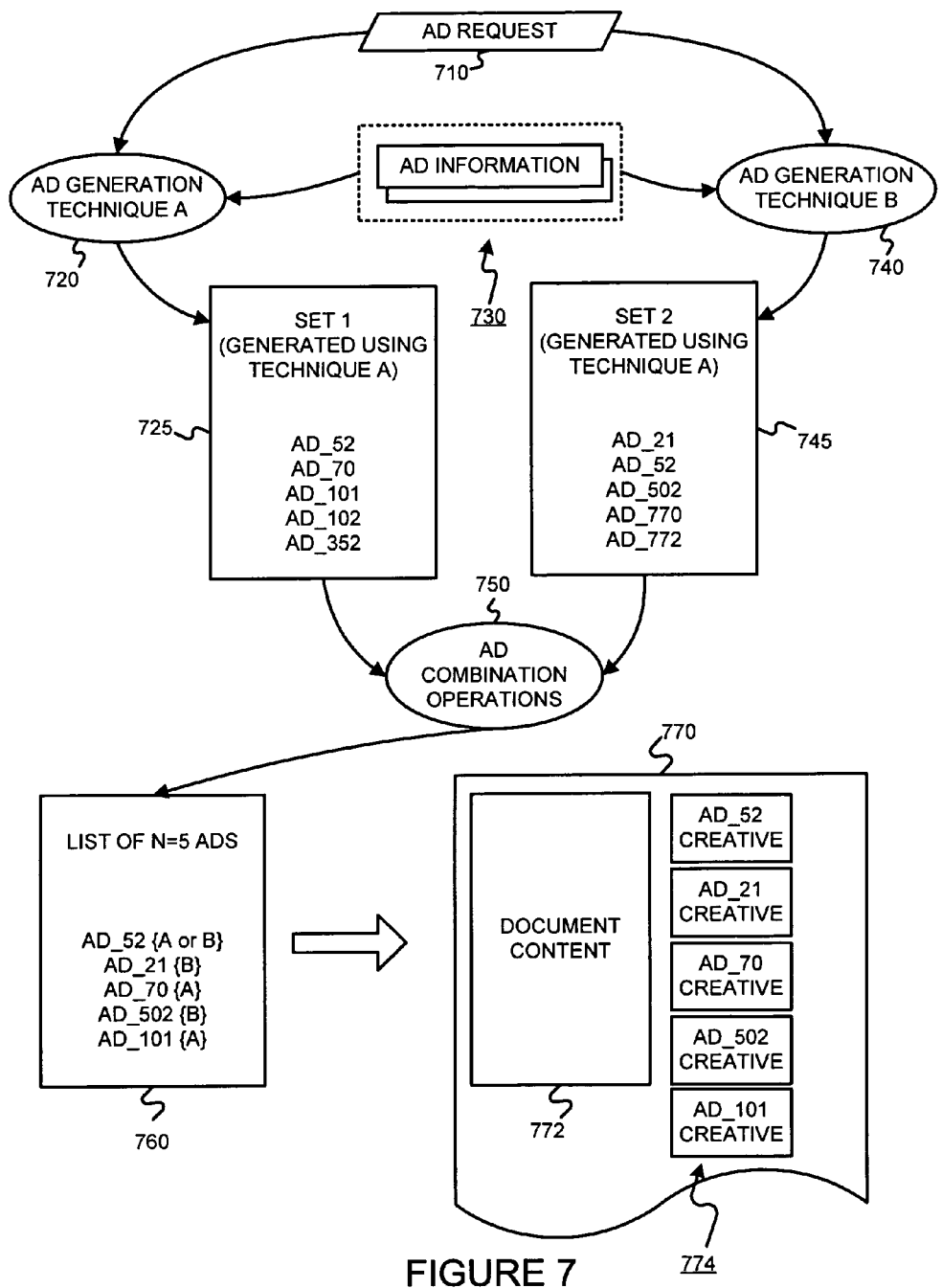
FIG. 7 illustrates an example of operations that may occur in an exemplary embodiment of the present invention.

FIG. 7 illustrates an example of operations that may occur in an exemplary embodiment of the present invention. One or more of the operations shown may be controlled by, and/or exchange information with, ad selection, scoring, and or rendering technique comparison operations (not shown). (Recall, e.g., 395 of FIG. 3.) Ad request information 710 is provided to ad serving technique A 720 and ad serving technique B 740. The ad serving technique A 720 may use this ad request information 710, along with ad information 730, to generate a first set of ads 725. As shown, the first set of ads 725 includes AD_52, AD_70, AD_101, AD_102 and AD_352. The ad serving technique B 740 may use the ad request information 710, along with ad information 730 (which may be the same as that used by technique A, different than that used by technique A, etc.), to generate a second set of ads 745. As shown, the second set of ads 745 includes AD_21, AD_52, AD_502, AD_770, and AD_772.

Suppose ad combination operations 750 use the method 500 illustrated in FIG. 5 to generate a list of N=5 ads. Suppose further that ad combination operations 750 determine that the order will be A, then B. Accordingly, it 750 generates a list 760 of N=5 ads including AD_52 (A1), AD_21 (B1), AD_70 (A2), AD_502 (B3, since the list 760 already included AD_52) and AD_101 (A3). Notice that each ad in the list includes information which will let its performance be associated with the technique which generated it. Notice further that since AD_52 could have come from either list, its performance may be associated with both techniques. Alternatively, its performance may be associated with neither technique.

A document (such as a search results page, for example) 770 including content 772 and the interleaved ads 774 may be sent to an end user.

§4.4 Conclusions

As can be appreciated from the foregoing disclosure, the present invention can be used to evaluate and compare different ad selection techniques. The present invention may do so by combining ads generated using at least two different techniques and determining performance statistics of these combined (e.g., interleaved) advertising displays over time. The relative performance of the different techniques can then be determined. These principles can also be used to gauge different ad scoring techniques. These principles can also be used to gauge different ad rendering techniques (e.g., different appearances, such as different background colors, different ad formats, etc).

What is claimed is:

1. A method for determining performance of first and second ad generation techniques in an ad serving computer network, the method comprising:
    obtaining a first set of one or more ads, the first set being generated using a first ad generation technique and ad request information, the first ad generation technique including a first ad selection technique, a first ad scoring technique, or a first ad rendering technique, each ad in the first set having a first rank score associated therewith;
    obtaining a second set of one or more ads, the second set being generated using a second ad generation technique and the ad request information, the second ad generation technique including a second ad selection technique, a second ad scoring technique, or a second ad rendering technique, each ad in the second set having a second rank score associated therewith;
    preparing, by a processor, an interleaved order of ads from the first and second sets by:
        selecting one of the first ad generation technique and the second ad generation technique as an initial technique for the interleaved order;
        adding to a list of ads, from the selected initial technique, a next highest scoring ad not already included in the list of ads;
        adding to the list of ads, from the ad generation technique not selected by the processor, another next highest scoring ad not already included in the list of ads; and
        automatically repeating the adding operations in accordance with the interleaved order until the list of ads meets a threshold condition;
    in accordance with one or more serving parameters that specify (i) a webpage on which an ad is served, (ii) a search query or a search result associated with serving of the ad, (iii) a user characteristic specifying a type of browser used, one or more previous webpage views, or previous online behavior, or (iv) a host or affiliate site that initiated an ad request, serving a plurality of ads from the list of ads; and
    determining the performance of the first and second ad generation techniques by monitoring, over one or more networks, an online performance of each of the plurality of ads served, including updating a data repository with data specifying the online performance of each of the plurality of ads served and a respective indicator of that ad, the respective indicator identifying which ad generation technique produced that ad, wherein, when a particular ad of the plurality of ads served is in both the first and second sets of ads, the online performance of the particular ad is either associated with both the first and second ad generation techniques or is not associated with either of the first and second ad generation techniques.

2. The method of claim 1, wherein the selection of the initial technique for the interleaved order is a random selection.

3. The method of claim 1, wherein the interleaved order alternates back and forth between a single ad from the selected ad generation technique followed by a single ad from the not selected ad generation technique.

4. The method of claim 1, wherein the interleaved order alternates back and forth between two or more consecutive ads from the selected ad generation technique followed by two or more consecutive ads from the not selected ad generation technique.

5. The method of claim 1, wherein serving the plurality of ads includes interleaving a spatial position of the ads from the first set of ads and the second set of ads on a document to be displayed.

6. The method of claim 5 wherein the document is a search results page.

7. The method of claim 5 wherein the document is a Web page.

8. The method of claim 5 wherein the document is an e-mail.

9. The method of claim 1, wherein serving the plurality of ads includes interleaving a temporal position of the ads from the first set of ads and the second set of ads.

10. The method of claim 1, wherein the ads from the first set of ads are ordered using the first rank scores of the first set of ads, and the ads from the second set of ads are ordered using the second rank scores of the second set of ads.

11. The method of claim 1, wherein the first ad generation technique uses a different ad selection technique than the second ad generation technique.

12. The method of claim 11 wherein the first ad generation technique uses a same ad scoring technique as the second ad generation technique.

13. The method of claim 12 wherein the first ad generation technique uses a same ad rendering technique as the second ad generation technique.

14. The method of claim 12 wherein the first ad generation technique uses a different ad rendering technique than the second ad generation technique.

15. The method of claim 11 wherein the first ad generation technique uses a different ad scoring technique than the second ad generation technique.

16. The method of claim 15 wherein the first ad generation technique uses a same ad rendering technique as the second ad generation technique.

17. The method of claim 15 wherein the first ad generation technique uses a different ad rendering technique than the second ad generation technique.

18. The method of claim 11 wherein the first ad generation technique uses a different ad rendering technique than the second ad generation technique.

19. The method of claim 11 wherein the first ad generation technique uses a same ad rendering technique as the second ad generation technique.

20. The method of claim 19 wherein the first ad generation technique uses a same ad scoring technique as the second ad generation technique.

21. The method of claim 1, wherein the first ad generation technique uses a same ad scoring technique as the second ad generation technique, but a different ad rendering technique.

22. The method of claim 21 wherein the first ad generation technique uses a same ad selection technique as the second ad generation technique.

23. The method of claim 1, wherein the first ad generation technique uses a same ad rendering technique as the second ad generation technique, but a different ad scoring technique.

24. The method of claim 23 wherein the first ad generation technique uses a same ad selection technique as the second ad generation technique.

25. The method of claim 1 wherein the first ad generation technique uses a different ad scoring technique and a different ad rendering technique than the second ad generation technique.

26. The method of claim 25 wherein the first ad generation technique uses a same ad selection technique as the second ad generation technique.

27. The method of claim 1, wherein the first ad generation technique uses a different ad scoring technique than the second ad generation technique, and wherein the performance of the first ad generation technique and the second ad generation technique is monitored by monitoring click-through performance of the served plurality of ads.

28. The method of claim 1, wherein the first ad generation technique uses a different ad scoring technique than the second ad generation technique, and wherein the performance of the first ad generation technique and the second ad generation technique is monitored by monitoring conversion performance of the served plurality of ads.

29. The method of claim 1, wherein the first ad generation technique uses a different ad selection technique than the second ad generation technique, and wherein the performance of the first ad generation technique and the second ad generation technique is monitored by monitoring click-through performance of the served plurality of ads.

30. The method of claim 1, wherein the first ad generation technique uses a different ad selection technique than the second ad generation technique, and wherein the performance of the first ad generation technique and the second ad generation technique is monitored by monitoring conversion performance of the served plurality of ads.

31. The method of claim 1, wherein the first ad generation technique uses a different ad rendering technique than the second ad generation technique, and wherein the performance of the first ad generation technique and the second ad generation technique is monitored by monitoring click-through performance of the served plurality of ads.

32. The method of claim 1, wherein the first ad generation technique uses a different ad rendering technique than the second ad generation technique, and wherein the performance of the first ad generation technique and the second ad generation technique is monitored by monitoring conversion performance of the served plurality of ads.

33. An apparatus for determining performance of first and second ad generation techniques in an ad serving computer network, the apparatus comprising:
  a memory configured to store a list of ads;
  a processor coupled to the memory, the processor being configured to:
    obtain a first set of one or more ads, the first set having been generated using a first ad generation technique and ad request information, the first ad generation technique including a first ad selection technique, a first ad scoring technique, or a first ad rendering technique, each ad in the first set having a first rank score associated therewith;
    obtain a second set of one or more ads, the second set having been generated using a second ad generation technique and the ad request information, the second ad generation technique including a second ad selection technique, a second ad scoring technique, or a second ad rendering technique, each ad in the second set having a second rank score associated therewith;

prepare an interleaved order of ads from the first and second sets by:

selecting one of the first ad generation technique and the second ad generation technique as an initial technique for the interleaved order;

adding to the list of ads, from the selected initial technique, a next highest scoring ad not already included in the list of ads;

adding to the list of ads, from the ad generation technique not selected by the processor, another next highest scoring ad not already included in the list of ads; and automatically repeating the adding operations in accordance with the interleaved order until the list of ads meets a threshold condition;

in accordance with one or more serving parameters that specify (i) a webpage on which an ad is served, (ii) a search query or a search result associated with serving of the ad, (iii) a user characteristic specifying a type of browser used, one or more previous webpage views, or previous online behavior, or (iv) a host or affiliate site that initiated an ad request, serve a plurality of ads from the list of ads; and determine the performance of the first and second ad generation techniques by monitoring, over one or more networks, an online performance of the plurality of ads served, including updating a data repository with data specifying the online performance of each of the plurality of ads served and a respective indicator of that ad, the respective indicator identifying which ad generation technique produced that ad, wherein, when a particular ad of the plurality of ads served is in both the first and second sets of ads, the online performance of the particular ad is either associated with both the first and second ad generation techniques or is not associated with either of the first and second ad generation techniques.

34. The apparatus of claim 33, wherein the selection of the initial technique for the interleaved order is a random selection.

35. The apparatus of claim 33, wherein the interleaved order alternates back and forth between a single ad from the selected ad generation technique followed by a single ad from the not selected ad generation technique.

36. The apparatus of claim 33, wherein the interleaved order alternates back and forth between two or more consecutive ads from the selected ad generation technique followed by two or more consecutive ads from the not selected ad generation technique.

37. The apparatus of claim 33, wherein the processor serves the plurality of ads by interleaving a spatial position of the ads from the first set of ads and the second set of ads on a document to be displayed.

38. The apparatus of claim 37 wherein the document is a search results page.

39. The apparatus of claim 37 wherein the document is a Web page.

40. The apparatus of claim 37 wherein the document is an e-mail.

41. The apparatus of claim 33, wherein the processor serves the plurality of ads by interleaving a temporal position of the ads from the first set of ads and the second set of ads.

42. The apparatus of claim 33, wherein the ads from the first set of ads are ordered using the first rank scores of the first set of ads, wherein the ads from the second set of ads are ordered using the second rank scores of the second set of ads.

43. The apparatus of claim 33, wherein the first ad generation technique uses a different ad selection technique than the second ad generation technique.

44. The apparatus of claim 43 wherein the first ad generation technique uses a same ad scoring technique as the second ad generation technique.

45. The apparatus of claim 44 wherein the first ad generation technique uses a same ad rendering technique as the second ad generation technique.

46. The apparatus of claim 44 wherein the first ad generation technique uses a different ad rendering technique than the second ad generation technique.

47. The apparatus of claim 43 wherein the first ad generation technique uses a different ad scoring technique than the second ad generation technique.

48. The apparatus of claim 47 wherein the first ad generation technique uses a same ad rendering technique as the second ad generation technique.

49. The apparatus of claim 47 wherein the first ad generation technique uses a different ad rendering technique than the second ad generation technique.

50. The apparatus of claim 43 wherein the first ad generation technique uses a different ad rendering technique than the second ad generation technique.

51. The apparatus of claim 43 wherein the first ad generation technique uses a same ad rendering technique as the second ad generation technique.

52. The apparatus of claim 51 wherein the first ad generation technique uses a same ad scoring technique as the second ad generation technique.

53. The apparatus of claim 33, wherein the first ad generation technique uses a same ad scoring technique as the second ad generation technique, but a different ad rendering technique.

54. The apparatus of claim 53 wherein the first ad generation technique uses a same ad selection technique as the second ad generation technique.

55. The apparatus of claim 33, wherein the first ad generation technique uses a same ad rendering technique as the second ad generation technique, but a different ad scoring technique.

56. The apparatus of claim 55 wherein the first ad generation technique uses a same ad selection technique as the second ad generation technique.

57. The apparatus of claim 33, wherein the first ad generation technique uses a different ad scoring technique and a different ad rendering technique than the second ad generation technique.

58. The apparatus of claim 57 wherein the first ad generation technique uses a same ad selection technique as the second ad generation technique.

59. The apparatus of claim 33, wherein the first ad generation technique uses a different ad scoring technique than the second ad generation technique, and wherein the processor is further configured to monitor click-through performance of the served plurality of ads.

60. The apparatus of claim 33, wherein the first ad generation technique uses a different ad scoring technique than the second ad generation technique, and wherein the processor is further configured to monitor conversion performance of the served plurality of ads.

61. The apparatus of claim 33, wherein the first ad generation technique uses a different ad selection technique than the second ad generation technique, and wherein the processor is further configured to monitor click-through performance of the served plurality of ads.

62. The apparatus of claim 33, wherein the first ad generation technique uses a different ad selection technique than the second ad generation technique, and wherein the processor is further configured to monitor conversion performance of the served plurality of ads.

63. The apparatus of claim 33, wherein the first ad generation technique uses a different ad rendering technique than the second ad generation technique, and wherein the processor is further configured to monitor click-through performance of the served plurality of ads.

64. The apparatus of claim 33, wherein the first ad generation technique uses a different ad rendering technique than the second ad generation technique, and wherein the processor is further configured to monitor conversion performance of the served plurality of ads.

* * * * *